United States Patent [19]

Visser et al.

[11] 3,896,094
[45] July 22, 1975

[54] PREPARATION OF ALPHA-OLEFIN COPOLYMERS WITH VANADIUM PHOSPHORODITHIOATE CATALYST

[75] Inventors: Harry D. Visser, Cheshire; Walter Nudenberg, Newtown, both of Conn.

[73] Assignee: Uniroyal, Inc., New York, N.Y.

[22] Filed: Mar. 25, 1974

[21] Appl. No.: 454,346

[52] U.S. Cl. ...... 260/80.78; 252/431 P; 260/88.2 R; 260/88.2 E; 260/94.4; 260/94.9 CB
[51] Int. Cl. ...... C08f 15/40; C08f 15/02; C08f 1/42
[58] Field of Search ...................... 260/80.78, 88.2

[56] References Cited
UNITED STATES PATENTS

| | | | |
|---|---|---|---|
| 3,294,829 | 12/1966 | Lehman et al. | 260/429.9 |
| 3,595,843 | 7/1971 | Huerta et al. | 260/80.78 |
| 3,595,844 | 7/1971 | Huerta et al. | 260/80.78 |
| 3,595,890 | 7/1971 | Huerta et al. | 260/429 R |
| 3,819,592 | 6/1974 | Visser et al. | 260/80.78 |

OTHER PUBLICATIONS

Furlani et al., J. Chem. Soc., (A), 1970, pages 2929–2934

*Primary Examiner*—Joseph L. Schofer
*Assistant Examiner*—A. L. Clingman
*Attorney, Agent, or Firm*—James J. Long

[57] ABSTRACT

Vandium phosphorodithioates represented by the formula:

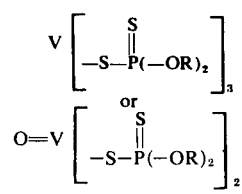

where R is an alkyl group with 1–10 carbon atoms are effective catalysts in the preparation of copolymers of alpha-olefins, e.g., ethylene/propylene rubber (EPR), and the terpolymers of the alpha-olefins with the non-conjugated dienes, e.g., ethylene/propylene/diene terpolymers (EPDM rubber), when an alkyl aluminum is used as a cocatalyst. These catalyst systems are very efficient and can be modified with a zinc compound to give liquid elastomers.

33 Claims, No Drawings

PREPARATION OF ALPHA-OLEFIN COPOLYMERS WITH VANADIUM PHOSPHORODITHIOATE CATALYST

Copending application Ser. No. 391,902 of the present inventors, filed Aug. 27, 1973, now U.S. Pat. No. 3,819,592 issued June 25, 1974, the disclosure of which is hereby incorporated herein by reference, discloses copolymerization of alpha-olefins using a vanadium saltalkylaluminum halide catalyst system, in the presence of regulators which include phosphorodithioates of metals, including zinc and vanadium.

This invention relates to a method of copolymerizing alpha-olefins.

Transition metal compounds of various types have been disclosed in the prior art: see U.S. Pat. Nos. 3,294,828, Werner, Dec. 27, 1966, and 3,361,778, Penderson, Jan. 2, 1968. The soluble-type vanadium compounds are of particular interest because of their ability to make amorphous sulfur-vulcanizable EPDM elastomers. Among the vanadium compounds which may be used are vanadium halides, oxyhalides, alkoxides and acetylacetonates. Some better known examples of these compounds are vanadium trichloride, vanadium tetrachloride, vanadium oxytrichloride, trialkyl vanadate, vanadyl acetylacetonate and vanadium tris-acetylacetonate. Recently vanadium organophosphates have been disclosed as effective vanadium coordination catalyst for the production of EPR and EPDM elastomers (U.S. Pat. Nos. 3,595,843, 3,595,844 and 3,595,890, Huerta et al, July 27, 1971) These catalysts are described as vanadium (IV) compounds which may be either monomeric or oligomeric, but the dimeric structure seems to predominate (see especially U.S. Pat. No. 3,595,890). Organophosphates ligands of the type named in the above mentioned vanadium catalyst are commonly used monomers for inorganic coordination polymers (U.S. Pat. No. 3,483,142, Saraceno, Dec. 9, 1969). The vanadium organophosphate polymerization catalyst are a special case of these inorganic polymers where only low molecular weight polymers or oligomers are formed.

The invention is concerned with the preparation of ethylene-alpha-olefin copolymer rubbers, especially ethylene/propylene copolymers, and more particularly it relates to the use of vanadium dialkyl phosphorodithioates complexes as catalyst together with an organoluminum halide cocatalyst for the preparation of such polymers.

The vanadium catalyst described in this invention contains sulfur base ligands rather than oxygen based structures. These sulfur based ligands are better chelating agents and consequently only monomeric vanadium complexes are obtained. In other words, organophosphate ligands tend to bridge two different metal atoms (hence oligomer formation), whereas the dialkylphosphorodithioate ligands chelate themselves around one singe metal atom (hence true monomeric complex formation). As a result of their monomeric nature these vanadium dialkyl phosphorodithioate catalysts show greater hydrocarbon solubility, especially aliphatic hydrocarbon solubility, e.g., hexane solubility.

The vanadium complexes described in this invention differ from the more common EPR or EPDM catalyst (e.g. VOCl$_3$) in that they remain active for a longer period of time. With catalyst like VOCl$_3$ or VO(OR)$_3$ most of the polymerization occurs during the first few minutes ater the vanadium catalyst contacts the alkyl aluminum halide cocatalyst in the polymerizing mixture. These vanadium phosphorodithioate catalyst continue to show catalytic activity for 30-60 minutes.

In spite of this comparatively long catalyst lifetime, there is no evidence of any change in nature of the active species with time. The molecular weight distribution does not change with time and the overall or final molecular weight distribution is very narrow. This latter fact is usually obtained only from soluble or homogeneous catalyst systems.

The method for preparation of these vanadium dithiophosphate is described in the technical literature (C. Furlani, A.A.G. Tomlinson, P. Porta, and A. Sgamellotti, J. Chen. Soc. (A), 1970, 2929, and R. G. Cavell, E. D. Day, W. Byers, and P. M. Watkins, Inorg. Chem., 1972, 11, 1591). Basically this method involves the reaction between a vanadium halide (e.g. VCl$_3$) or sulfate (e.g. VOSO$_4$) of the appropriate valence state with a sodium or ammonium salt of a dithiophosphoric acid.

It is to be emphasized that the catalyst system employed in the invention is of the soluble kind (i.e., soluble in the monomers and/or in the usual solvents used as polymerization media, e.g., hexane), as distinguished from insoluble or heterogeneous catalyst systems. The alkylaluminum halides that form the catalyst system along with the vanadium compound may be a dialkylaluminum halide, a monoalkylaluminum dihalide or a alkylaluminum sesquihalide, where the alkyl group can have from 1 to 10 carbon atoms, such as a methyl, ethyl, propyl, etc. The halogen in these organoaluminum compounds is usually chlorine, although bromine or other halogen may be used.

As in conventional practice, the molar ratio of aluminum to vanddium is at least 4:1 and usually about 10:1; higher ratios such as 20:1, 35:1, 50:1, or even higher, may be used. If desired, very high ratios of aluminum to vandium (e.g. 200:1 or higher) may be employed, especially in those cases where the concentration of the vanadium compound is very small.

The vanadium phosphorodithioate compounds that can be used as catalyst for the polymerization of ethylenealpha-olefins in accordance with this invention are represented by the following formula:

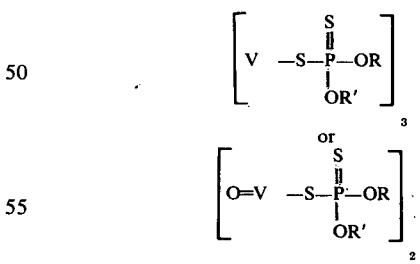

where R and R' are alkyl groups with 1 to 10 or more carbon atoms, preferably from 2 to 5 carbon atoms. R and R' in the stated formula can be the same or different and can be for example, methyl, ethyl, n-butyl, isobutyl, tert.-butyl, amyl, hexyl, octyl, dodecyl or octadecyl.

Another feature of these catalyst is the relative ease with which they can be modified to give a liquid EPR or EPDM product, i.e., a so-called "liquid elastomer." This high degree of molecular weight regulation can be achieved by adding a soluble zinc additive, such as zinc sterate, or a zinc compound which will react with alkyl aluminum halide cocatalyst to give a soluble zinc source (see Ser. No. 391,902 referred to above).

To prepare a liquid elastomer the soluble zinc additive is usually employed in molar levels of between 0.5 to 2 times that of the vanadium catalyst. In general the liquid elastomers cover a broad range of bulk viscosities. A liquid elastomer is often defined as any crosslinkable elastomer which can be pumped or poured at a reasonable temperature. In terms of measurable quantities this is usually taken to mean a crosslinkable elastomer with a Brookfield viscosity of 1500 poises or less at temperatures from room temperature up to 100°C. The synthetic methods described in this invention are sufficiently versatile so that they can make liquid ethylenepropylene interpolymers of any desired viscosity in the 25° to 100°C range.

One of the advantages of liquid elastomers (low molecular weight interpolymers) is that the curvatives can easily be dispersed into the compounded formulation by hand mixing or by some other simple mechanical mixing equipment. This advantage is most significant in cases where the curing system is operative at ambient temperature or some modest temperature above room temperature. Examples of such cure systems are the following: (a) quinone dioxime/$PbO_2$ (b) halomethyl phenolic/ZnO (c) accelerated sulfur. Curable liquid ethylene-$\alpha$-olefindiene interpolymers can be utilized as adhesives, caulking compounds, sealants and plasticizing coagulants. These liquid terpolymers and the ethylene-$\alpha$-olefin copolymers can also be used as tackfiers, plasticizers, or lubricants where curing is not a necessary requirement.

The present invention is applicable to the production of copolymers of ethylene and at least one alpha-olefin (e.g., propylene, 1-butene, 1-octene, etc.), as well as in the production of unsaturated, sulfur-vulcanizable, rubbery terpolymers of ethylene, an alpha-olefin, and a copolymerizable polyene, especially a diene, particularly a non-conjugated diene such as dicyclopentadiene, bicyclonoadien, 1,4-hexadiene, 5-methylene-2-norbornene, 5-ethylidene-2-norbornene, 5-propylidene-2-norbornene, etc. Preferred terpolymers contain from about 1 to about 25 percent (more preferrably about 2 to about 25 percent) by weight of a non-conjugated diene such as dicyclopentadiene or the like; the remaining portion of the terpolymer contains propylene (or other alpha-olefin) and ethylene in the weight ratio in the range from about 15/85 to about 85/15. Ethylenepropylene binary copolymers have the same weight ratio of propylene and ethylene as the terpolymers.

The polymerization is conveniently carried out in a solvent, although an added solvent is not essential; the monomers being polymerized can serve as the solvent. In general, the normal solvents for coordination anionic polymerization can be used. These include the aromatic hydrocarbons (e.g., benzene, toluene or xylene), aliphatic hydrocarbons (e.g. hexane or heptane), chlorobenzene, tetrachloroethylene, and any other inert solvent which will not destroy the catalyst. The temperature is not critical and may be as in conventional practice, e.g., from 0°C to 100°C.

The procedure may otherwise be the same as in conventional practice as far as such details as type of polymerization equipment, pressure, concentration of catalyst, and the like, are concerned and may be carried out batchwise or continuously (see for example U.S. Pat. 3,341,503, Paige et at, Sept. 12, 1967). Incremental addition of ingredients may be employed.

In a continuous polymerization the organoaluminum compound, the regulator and the vanadium compound may be added as separate feeds to the monomer solution. In a batch polymerization a preferred procedure involves combining the organoaluminum compound and the regulator in the presence of at least a portion of the monomers and then adding the vanadium compound.

The following examples will serve to illustrate the practice of the invention in more detail.

EXAMPLE 1

This example illustrates the use of vanadium (III) tris-(O,O-di-n-amyl phosphorodithioate) as catalyst together with an organoaluminum halide cocatalyst, ethylaluminum sesquichloride (abbreviated as EASC), in the preparation of ethylene-propylene copolymer rubber.

The reactor employed was a dry 1-gallon glass autoclave equipped with a pressure gauge, thermometer, gas inlet tube, stirrer, rubber gasket for liquid injection, and an internal cooling coil attached to an external cooling source. Into this reaction were introduced 2700 ml of dry n-hexane at 30°C, 30 mmoles of ethylaluminum sesquichloride as a 25 percent by weight solution in hexane. Propylene gas was fed into the reactor to an internal pressure of 30 psig at a temperature of 30°C. Then 3 mmoles of vanadium (III) tris-(O,O-di-n-amyl phosphorodithioate) was added as a 2.5 wt. percent solution in hexane. The reaction was allowed to proceed for 60 minutes while maintaining the temperature at 30°C and the pressure at 50 psig by feeding ethylene and propylene at a 1/1 molar ratio. After 60 minutes the polymerization was terminated by the addition of 2 ml of propylene glycol (molecular weight about 2,000). The copolymer was precipitated by adding the reaction mixture to 3,000 ml of isopropanol containing 0.4 percent by weight of 2,2'-methylene-bis-(4-methyl-6-t-butylphenol) antioxidant. The polymer was dried overnight under vacuum at 40°C. The yield was 174.5 grams of polymer containing 48 percent propylene by weight and had an intrinsic viscosity of 2.01 (all intrinsic viscosities herein are expressed as deciliters per gram in tetralin at 135°C). This data is included in Table I.

EXAMPLES 2–3

These examples illustrate the use of vanadium (III) tris(O,O-di-n-amyl phosphorodithioate) as catalyst together with cocatalyst EASC In the preparation of ethylene/propylene/5-ethylidene-2-nonbornene (abbreviated as ENB) and ethylene/propylene/dicyclopentadiene (abbreviated as DCPD) terpolymers, respectively. The procedure was identical to that of Example 1 with the exception that a total of 17 ml of the diene was added in two portions. The initial portion was added just after the EASC injection and just prior to the propylene loading, while the second portion was added 10 minutes after the catalyst addition. The polymerization data and analytical results are shown in Table I.

EXAMPLES 4–6

These examples illustrate the use of vanadyl bis(O,O- di-n-amyl phosphorodithioate) as catalyst together with cocatalyst EASC In the preparation of ethylene/propylene binary copolymer, ethylene/propylene/5-ethylidene-2-norbornene and ethylene/propylene/dicyclopentadiene terpolymers, respectively. The procedure used in Examples 4, 5 and 6 is identical to that of Examples 1, 2 and 3, respectively, with the exception of the catalyst type. The polymerization data and analytical results are shown in Table I.

EXAMPLES 7–10

These four examples demonstrate the use of these vanadium phosphorodithioate catalyst to prepare liquid elastomers. The first two examples (i.e., examples 7 and 8) employ the use of a vanadium (III) di-n-amyl phosporodithioate catalyst while the latter two examples (i.e., examples 9 and 10) use vanadyl (IV) di-n-amyl phosporodithioate. The polymers made in examples 7 and 9 are copolymers, whereas the polymers made in examples 8 and 10 are ENB type EPDM polymers. Zinc stearate was used as the catalyst modifier and was added to the reactor just prior to the EASC cocatalyst. With the exception of zinc stearate the procedure was the same as that outlined in Examples 1, 2 and 3. The polymerization data and analytical results are shown in Table II.

(2)

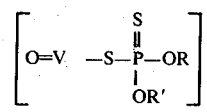

where R and R' are the same or different and are alkyl groups with 1 to 10 carbon atoms and a cocatalyst which is an alkyl aluminum halide.

2. A method as in claim 1 in which the said catalyst has the said formula (1).

3. A method as in claim 1 in which the said catalyst has the said formula (2).

4. A method as in claim 1 in which R and R' have 1 to 5 carbon atoms.

5. A method as in claim 1 in which R and R' are n-amyl.

6. A method as in claim 1 in which the said alkyl aluminum halide is an alkyl aluminum chloride.

7. A method as in claim 6 in which the said alkyl aluminum chloride is an alkyl aluminum sesquichloride.

8. A method as in claim 7 in which the said alkyl aluminum sesquichloride is ethyl aluminum sesquichloride.

9. A method as in claim 1 in which the said alpha-olefin is propylene.

TABLE I

| EXAMPLE: | 1 | 2 | 3 | 4 | 5 | 6 |
|---|---|---|---|---|---|---|
| Cocatalyst (mmoles Al) EASC | 60.0 | 60.0 | 60.0 | 60.0 | 60.0 | 60.0 |
| Catalyst (mmoles) | | | | | | |
| V(DADTP)₃* | 3.0 | 3.0 | 3.0 | | | |
| O=V(DADTP)₂** | | | | 3.0 | 3.0 | 3.0 |
| Diene | — | ENB | DCPD | — | ENB | DCPD |
| Yield, g. | 174.5 | 163.5 | 130.0 | 148.2 | 141.4 | 137.7 |
| Iodine Number | — | 16.8 | 15.5 | — | 16.0 | 12.0 |
| Propylene, wt.% | 48 | 45 | 42 | 51 | 42 | 36 |
| Intrinsic Viscosity (135°C) | 2.01 | 2.03 | 2.29 | 1.68 | 1.90 | 3.30 |

| EXAMPLE: | 7 | 8 | 9 | 10 |
|---|---|---|---|---|
| Cocatalyst (mmoles Al) EASC | 60.0 | 60.0 | 60.0 | 60.0 |
| Catalyst (mmoles) | | | | |
| V(DADTP)₃* | 3.0 | 3.0 | | |
| O=V(DADTP)₂** | | | 3.0 | 3.0 |
| Zinc Stearate (mmoles) | 3.0 | 3.0 | 3.0 | 3.0 |
| Diene | — | ENB | — | ENB |
| Yield, g. | 138 | 150 | 125 | 103 |
| Iodine Number | — | 17 | — | 27 |
| Propylene, wt.% | 52 | 46 | 45 | 41 |
| Intrinsic Viscosity (135°C) | 0.21 | 0.26 | 0.41 | 0.32 |
| Brookfield Viscosity at 50°C, poises | 762 | 4,700 | — | 14,000 |

*Vanadium (III) tris-(O,O-di-n-amyl phosphorodithioate).
**Vanadyl bis-(O,O-di-n-amyl phosphorodithioate).

We claim

1. A method of copolymerizing ethylene and an alpha-olefin with or without a copolymerizable nonconjugated diene to form a copolymer of the said monomers comprising contacting the said monomers in an inert organic solvent with a catalyst which is a vanadium phosphorodithioate of one of the formulas (1) or (2)

(1)

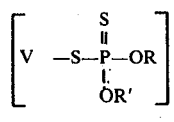

10. A method as in claim 1 in which a copolymerizable non-conjugated diene is present.

11. A method as in claim 10 in which the said non-conjugated diene is 5-ethylidene-2-norbornene.

12. A method as in claim 10 in which the said non-conjugated diene is dicylopentadiene.

13. A method as in claim 1 in which the said monomers are ethylene and propylene and a binary copolymer of said monomers is formed.

14. A method as in claim 1 in which the said catalyst in vanadium (III) tris-(O,O-di-n-amyl phosphorodithioate).

15. A method as in claim 1 in which the said catalyst is vanadyl bis-(O,O-di-n-amyl phosphorodithioate).

16. A method as in claim 1 in which a zinc compound soluble in the polymerization mixture is also present, whereby the molecular weight of the resulting copolymer is regulated so that the resulting copolymer is a liquid at ambient temperature.

17. A method as in claim 16 in which the said zinc compound is zinc stearate.

18. A method as in claim 1 in which the said alpha-olefin is propylene, R and R' have 1 to 5 carbon atoms, and the said cocatalyst is an alkyl aluminum sesquichloride.

19. A method as in claim 18 in which a copolymerizable non-conjugated diene is present and the said alkyl aluminum sesquichloride is ethyl aluminum sesquichloride.

20. A method as claim 19 in which the said copolymerizable non-conjugated diene is 5-ethylidene-2-norbornene.

21. A method as in claim 20 in which the said catalyst is vanadium (III) tris-(O,O-di-n-amyl phosphorodithioate).

22. A method as in claim 21 in which a zinc compound soluble in the polymerization mixture is also present, whereby the molecular weight of the resulting copolymer is regulated so that the resulting copolymer is a liquid at ambient temperature.

23. A method as in claim 22 in which the said zinc compound is zinc stearate.

24. A method as in claim 20 in which the said catalyst is vanadyl bis-(O,O-di-n-amyl phosphorodithioate).

25. A method as in claim 24 in which a zinc compound soluble in the polymerization mixture is also present, whereby the molecular weight of the resulting copolymer is regulated so that the resulting copolymer is a liquid at ambient temperature.

26. A method as in claim 25 in which the said zinc compound is zinc stearate.

27. A method as in claim 19 in which the said copolymerizable non-conjugated diene is dicyclopentadiene.

28. A method as in claim 27 in which the said catalyst is vanadium (III) tris-(O,O-di-n-amyl phosphorodithioate).

29. A method as in claim 28 in which a zinc compound soluble in the polymerization mixture is also present, whereby the molecular weight of the resulting copolymer is regulated so that the resulting copolymer is a liquid at ambient temperature.

30. A method as in claim 29 in which the said zinc compound is zinc stearate.

31. A method as in claim 27 in which the said catalyst is vanadyl bis-(O,O-di-n-amyl phosphorodithioate).

32. A method as in claim 31 in which a zinc compound soluble in the polymerization mixture is also present, whereby the molecular weight of the resulting copolymer is regulated so that the resulting copolymer is a liquid at ambient temperature.

33. A method as in claim 32 in which the said zinc compound is zinc stearate.

* * * * *

UNITED STATES PATENT AND TRADEMARK OFFICE
CERTIFICATE OF CORRECTION

PATENT NO. : 3,896,094
DATED : July 22, 1975
INVENTOR(S) : Harry D. Visser et al.

It is certified that error appears in the above-identified patent and that said Letters Patent are hereby corrected as shown below:

Column 2, line 50, in the formula, the "V" should be outside the bracket; line 55, in the formula, the "O = V" should be outside the bracket.

Column 5, line 64, in the formula, the "V" should be outside the bracket.

Column 6, line 3, in the formula, the "O = V" should be outside the bracket.

Signed and Sealed this second Day of March 1976

[SEAL]

Attest:

RUTH C. MASON
Attesting Officer

C. MARSHALL DANN
Commissioner of Patents and Trademarks